United States Patent [19]

Sumal

[11] Patent Number: 4,457,167

[45] Date of Patent: Jul. 3, 1984

[54] METHOD FOR MEASURING THE PULSATING AIR MASS ASPIRATED BY AN INTERNAL COMBUSTION ENGINE

[75] Inventor: Jaihind S. Sumal, Vaihingen-Ensingen, Fed. Rep. of Germany

[73] Assignee: Robert Bosch GmbH, Stuttgart, Fed. Rep. of Germany

[21] Appl. No.: 417,972

[22] Filed: Sep. 14, 1982

[30] Foreign Application Priority Data

May 19, 1982 [DE] Fed. Rep. of Germany ....... 3218931

[51] Int. Cl.³ .......................................... G01M 15/00
[52] U.S. Cl. ........................................ 73/118; 73/204
[58] Field of Search ................. 73/118, 204; 123/478, 123/480, 493

[56] References Cited

U.S. PATENT DOCUMENTS 4,275,695  6/1981  Bauer et al. ......................... 123/486

Primary Examiner—Jerry W. Myracle
Attorney, Agent, or Firm—Edwin E. Greigg

[57] ABSTRACT

A method is proposed for measuring the pulsating air mass aspirated by an internal combustion engine in a flow cross section. To this end, an upper reference value ($U_{or}$) is determined from the rpm of the engine, above which value a reversed flow of the air takes place, and an actual flowthrough measurement value ($U_s$) furnished by a flowthrough measuring device is compared with this upper reference value ($U_{or}$). Upon the attainment of the upper reference value ($U_{or}$) by the actual flowthrough measurement value ($U_s$), a time period ($t_r$) begins to run, which ends whenever the actual flowthrough measurement value ($U_s$) has again dropped down to the upper reference value ($U_{or}$). The time period ($t_r$) is stored in memory and serves in such a manner to correct the flowthrough measurement value ($U_s$) upon the occurrence of reversed flow that the polarity of the actual flowthrough measurement value ($U_s$) is reversed, at the most for the time period ($t_r$), whenever the actual flowthrough measurement value ($U_s$) attains a predetermined lower reference value ($U_{ur}$, $U_{smin}$).

8 Claims, 5 Drawing Figures

METHOD FOR MEASURING THE PULSATING AIR MASS ASPIRATED BY AN INTERNAL COMBUSTION ENGINE

BACKGROUND OF THE INVENTION

The invention is based on a method for measuring the pulsating air mass aspirated by an internal combustion engine as generally defined in U.S. Pat. Nos. 4,213,335 and 4,275,695. In certain engine operating ranges, very severe pulsation of the aspirated air may occur, particularly from the time the throttle valve is almost completely opened and the aspirated air mass is close to the maximum mean, and if known hot-wire and hot-film air flow rate meters are used for measuring the mass of air aspirated by internal combustion engines, this pulsation causes an incorrect flowthrough measurement by the flowthrough measuring device. Such incorrect flowthrough measurement signals are caused predominantly by the flow reversals taking place in these operating ranges, which are not recognized as such by the flowthrough measuring device, so that the mass of medium flowing backwards is not subtracted from the flowthrough measurement value but instead is added to it.

OBJECT AND SUMMARY OF THE INVENTION

The method according to the invention as described hereinafter has the advantage over the prior art in that the error in the flowthrough measurement value taking place when the air mass is reversed is correctable.

By means of the method according to the invention, advantageous further developments of and improvements to the method disclosed in the main claim are attainable. It is particularly advantageous to reverse the polarity of the flowthrough measurement value for the duration of the reversed flow.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
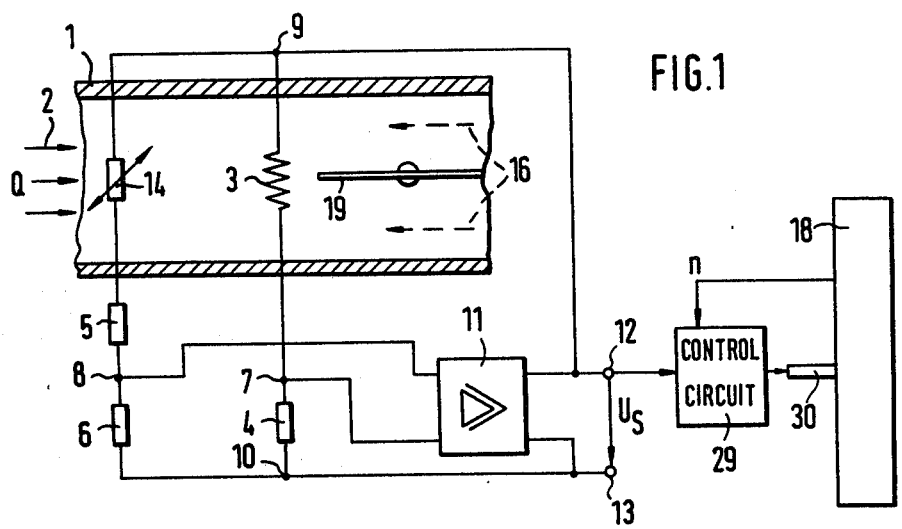
FIG. 1 is a circuit diagram of an apparatus for measuring the mass of air aspirated by an internal combustion engine and for correcting the flowthrough measurement value in the event of reversed flow.

In FIG. 1, a flow cross section 1 is shown, for instance an air intake tube of an internal combustion engine 18, through which a medium, for instance the air aspirated by the engine, flows in the direction of the arrows 2. A temperature-dependent measuring resistor 3 is located in the flow cross section 1, for example as part of a flowthrough measuring device. The measuring resistor 3 may be a hot-layer or hot-film resistor, for instance, or a hot wire, which experiences the flow through it of the output variable of a regulator and simultaneously furnishes the input variable for this regulator. The temperature of the temperature-dependent measuring resistor 3 is regulated by the regulator to a fixed value which is above the mean air temperature. If the flow velocity or in other words the air mass flowing per unit of time and having a flowthrough value Q now increases, then the temperature-dependent measuring resistor 3 cools down to a greater extent. This cooling is fed back to the input of the regulator, and the regulator thus increases its output variable such that the fixed temperature value is again established at the temperature-dependent measuring resistor 3. The output variable of the regulator, in the event of changes in the flowthrough value Q of the air, regulates the temperature of the temperature-dependent measuring resistor 3 to the predetermined value and simultaneously represents a standard measure for the aspirated air mass, which can be delivered as a flowthrough measurement value $U_s$ to a metering circuit of the engine 18, for instance, for the purpose of adapting the required fuel quantity to the mass of air aspirated per unit of time.

The temperature-dependent measuring resistor 3 is disposed in a resistance measuring circuit, for instance a bridge circuit, and together with a resistor 4 it forms a first bridge branch; a second bridge branch comprising the two fixed resistors 5 and 6 is connected parallel to it. The pickup point 7 is located between the resistors 3 and 4, and the pickup point 9 is located between the resistors 5 and 6. The two bridge branches are connected in parallel at points 9 and 10. The diagonal voltage of the bridge located between points 7 and 8 is supplied to the input of an amplifier 11, and the points 9 and 10 are connected to the output terminals of this amplifier 11, so that its output variable supplies the bridge with operating voltage or operating current. The flowthrough measurement value $U_s$ simultaneously serving as the adjustment variable can be picked up between the terminals 12 and 13, as shown.

The temperature-dependent measuring resistor 3 is heated, by the current flowing through it, up to a value at which the input voltage of the amplifier 11, that is, the bridge diagonal voltage, becomes zero or assumes a predetermined value. A predetermined current then flows from the output of the amplifier into the bridge circuit. If the temperature of the temperature-dependent measuring resistor 3 varies as a result of changes in the mass Q of the flowing air, then the voltage at the bridge diagonal also varies, and the amplifier 11 regulates the bridge supply voltage or current to a value at which the bridge is either balanced once again or is unbalanced in a predetermined manner. The output variable of the amplifier 11, that is, the adjustment variable $U_s$, like the current in the temperature-dependent measuring resistor 3, represents a standard measure for the mass of air aspirated by the engine.

In order to compensate for the influence of the air temperature on the flowthrough measurement value, it may be efficacious to include a second temperature-dependent resistor 14, which is surrounded by the flow of air, in the second bridge branch. The size of the resistors 5, 6 and 14 should be selected such that the lost power of the temperature-dependent resistor 14 generated by the branch current flowing through it is so slight that the temperature of this resistor 14 virtually does not vary with changes in the bridge voltage, but instead always corresponds to the temperature of the air flowing past it.

Figure 2:
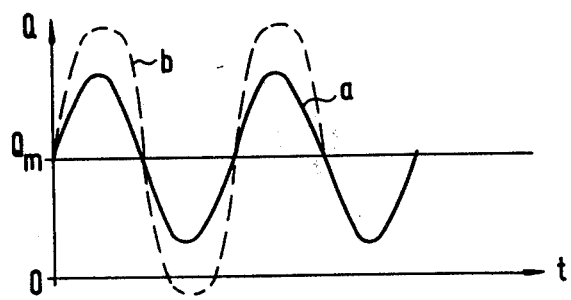
FIG. 2 is a diagram showing the course of the flowthrough value Q for the pulsating air mass plotted over the time t.

In FIG. 2, the course of the flowthrough value Q of a pulsating mass of medium is plotted over the time t; by way of example, this mass is the mass of air aspirated by the engine 18. This curve of the pulsating flow, in the ideal case, is sinusoidal. In FIG. 2, the symbol "a" indicates the curve of a pulsating flow in which no reversal of the flow direction occurs. The symbol "b" indicates the course, shown in dashed lines, of a pulsating flow in which a flow reversal as indicated by the arrows 16 in FIG. 1 does occur. Flowthrough measuring devices which do not recognize the flow direction of the flowing medium, such as thermal flowthrough measuring devices, make an error in measurement when there is a flow reversal, because the mass of medium flowing backwards is not subtracted from the flowthrough measurement value but rather is re-added to it.

Figure 3:
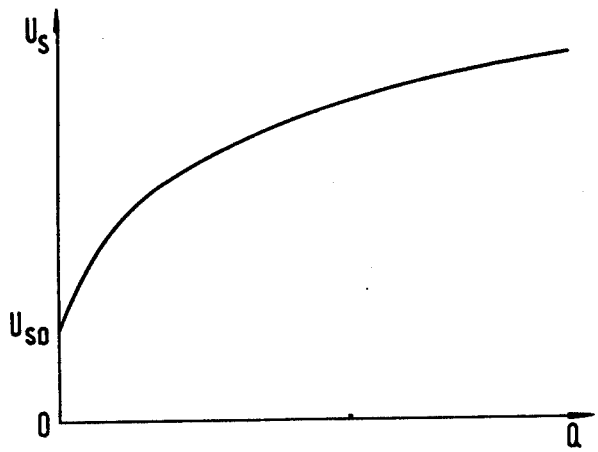
FIG. 3 is a diagram shown the characteristic curvce of a thermal flowthrough measuring device, with the flowthrough measurement value $U_s$ plotted over the flowthrough value Q of the air mass.

FIG. 3 shows the characteristic curve of a thermal flowthrough measuring device such as that of FIG. 1. The characteristic curve has pronounced slopes in the range where the flowthrough values Q are low, and thus great changes in the flowthrough measurement value $U_s$ occur in this range; on the other hand, at relatively large flowthrough values Q, the slope of the characteristic curve becomes flatter. A flowthrough measurement value $U_{so}$, which corresponds to a voltage of 1.5 V, for example, is associated with a flowthrough value of zero.

Figure 4:
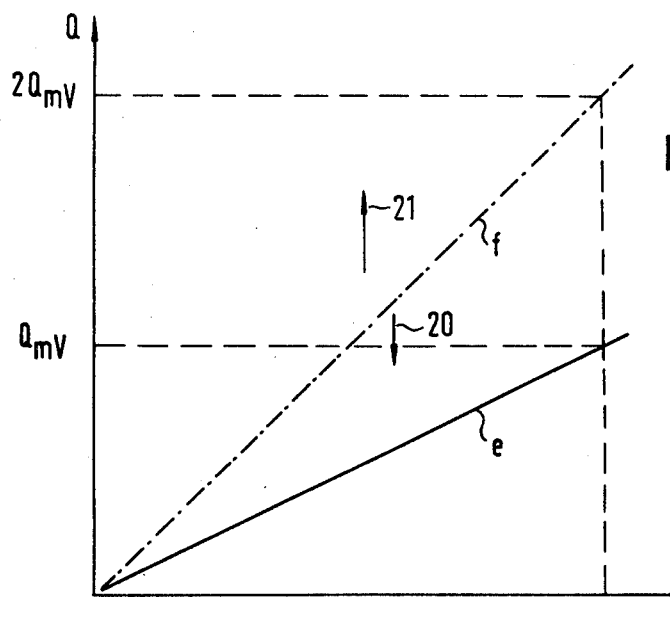
FIG. 4 is a diagram showing the disposition of the aspirated air mass Q dependent on the rpm n of the engine.

A reversal of the flow direction of the air aspirated by the engine, or in other words a backwards flow, does not occur in the intake manifold of an engine until the throttle valve 19 (see FIG. 1) is almost entirely opened, or in other words at full load or in the vicinity of the maximum mean flowthrough value $Q_{mv}$ for a given rpm n of the engine. As shown in FIG. 4, a linear relationship exists between the maximum mean air mass and the rpm n at full load, as indicated by line "e;" thus for the maximum mean flowthrough value $Q_{mv}$ at full load, $Q_{mv}=k \cdot n$, where k is a constant factor resulting from the slope of the line "e." Since the actual flowthrough value has a symmetrical course with respect to its mean value, a backward flow of the pulsating air mass always occurs if the actual flowthrough measurement value $U_s$ furnished by the flowthrough measuring device exceeds an upper reference value $U_{or}$ (see FIG. 5); this upper reference value corresponds to twice the maximum mean flowthrough value $Q_{mv}$ and can thus be expressed as $2Q_{mv}$. In FIG. 4, the symbol "f" indicates the course of the line of the doubled flowthrough value $2Q_{mv}$, plotted as a function of the rpm n. At flowthrough values Q below the line "f," in the direction of the arrow 20, no backwards flow is occurring in a pulsating flow, while at flowthrough values Q above the line "f," in the direction of the arrow 21, a flow reversal is occurring. In accordance with the invention, the course of the characteristic curve "e" having the association of the maximum mean flowthrough value $Q_{mv}$ to the rpm n is ascertained at full load for each engine, and the flowthrough value $Q_{mv}$ is doubled. The upper reference value $U_{or}$ corresponding to the doubled maximum flowthrough value $2Q_{mv}$ is then stored in memory in an electronic control unit 29 (see FIG. 1), which also receives, among others, the rpm n of the engine 18 and the flowthrough measurement value $U_s$ of the flowthrough measurement device in the form of electrical signals.

Figure 5:
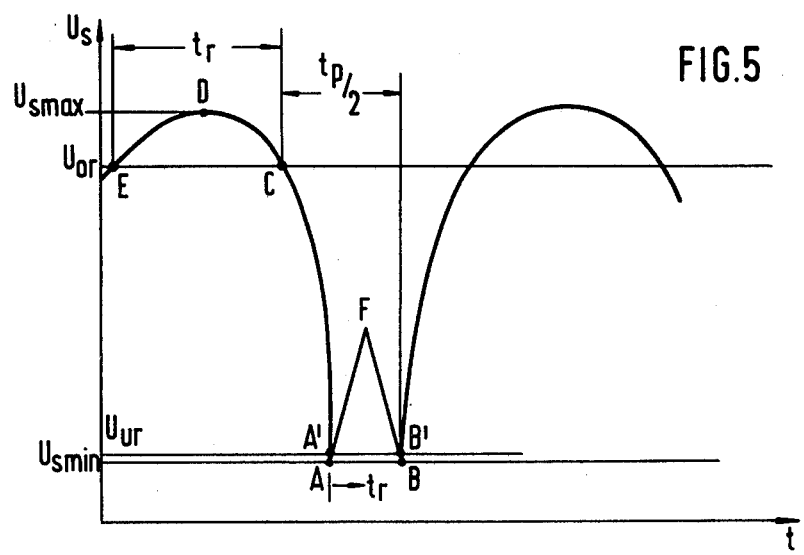
FIG. 5 is a diagram showing the course of the flowthrough measurement value $U_s$, ascertained by the flowthrough measuring device, dependent on the time t.

In FIG. 5, the curve of the actual flowthrough value $U_s$ over time t as furnished by the flowthrough measuring device is shown by way of example. If the actual flowthrough measurement value $U_s$ as furnished by the flowthrough measuring device exceeds the upper reference value $U_{or}$ as explained above, then a pulsating flow having a flow reversal is occurring. The flow reversal takes place between the points A and B, each of which represents a minimum flowthrough measurement value $U_{smin}$. Since without additional aids the flowthrough measuring device does not recognize that during the curve segment A-F-B an air mass is flowing counter to the actual aspiration direction 2, this air mass identified by the curve segment A-F-B is incorrectly added, instead of being subtracted. The air flow rate meter thus indicates a larger aspirated air mass than has actually been aspirated by the engine. This means that the fuel quantity associated by the electronic control unit 29 with the incorrectly large measured air mass produces an overly rich fuel-air mixture. The electronic control unit 29 controls in a known manner at least one fuel injection valve 30, such as shown generally, for example, in FIG. 1 of U.S. Pat. No. 4,275,695. In order to avoid the above error, the invention provides that a time period $t_r$ begins to run in the electronic control unit 29 as soon as the actual flowthrough measurement value $U_s$ attains the upper reference value $U_{or}$, at point E, and this time period $t_r$ ends when the actual flowthrough measurement value $U_s$, via a maximum actual flowthrough measurement value $U_{smax}$ at point D, has again dropped to the level of the upper reference value $U_{or}$ at point C. As the curve course shows, the time period $t_r$, which corresponds to the duration of the reversed flow, can be detected very accurately between points E and C. The time period $t_r$ can be stored in memory in the electronic control unit 29. This detected time period $t_r$ is now intended, according to the invention, to serve to correct the flowthrough measurement value $U_s$ during reversed flows. This can be accomplished, for example, in such a manner that the polarity of the actual flowthrough measurement value $U_s$ is reversed whenever the actual flowthrough measurement value $U_s$ has dropped to a predetermined lower reference value $U_{ur}$ at point A'. The lower reference value $U_{ur}$ should be selected such that a flow reversal is certain to occur when the actual flowthrough measurement value $U_s$ attains this lower reference value. The actual minimum flowthrough measurement value $U_{xmin}$ can also serve as the lower reference value $U_{ur}$. Upon the attainment of point A' or A, the stored time period $t_r$ begins to run. The polarity reversal is terminated, at the latest when the time period $t_r$ has elapsed at point A or A'. If the actual flowthrough measurement value already drops to the lower reference value $U_{ur}$ or the actual minimum flowthrough measurement value $U_{smin}$ even before the time period $t_r$ has elapsed, at points B' or B, then the polarity reversal of the flowthrough measurement value $U_s$ is also terminated before the time period $t_r$ has elapsed, that is, it is terminated upon the attainment of point B' or B.

The termination of the polarity reversal can also be effected, in another embodiment of the invention, in that the duration of oscillation $t_p$ of the pulsating air is detected on the basis of the rpm n of the engine in the control circuit 29 (an rpm (n) signal is shown being fed from the engine 18 to the control circuit 29; see also FIG. 1 in U.S. Pat. No. 4,275,695; the polarity reversal of the actual flowthrough measurement value $U_s$ is then made retroactive if half the oscillation duration $t_p/2$ has elapsed since the actual flowthrough value $U_s$ dropped to the upper reference value $U_{or}$, or in other words since the attainment of point C. The oscillation duration $t_p$ of the pulsating air mass is determined from the rpm n for a four-cylinder, four-stroke internal combustion engine, such that $t_p = \frac{1}{2}n$.

In accordance with another embodiment, a termination of the polarity reversal of the actual flowthrough measurement value $U_s$ before the time period $t_r$ (counted from point A or A') has elapsed can also be effected if a time $(t_r + t_p)/2$ has elapsed since the maximum actual flowthrough measurement value $U_{smax}$ at point D; this time corresponds to half the sum of the time period $t_r$ for the reversed flow and the oscillation time period $t_p$.

According to a still further form of embodiment, the polarity reversal of the actual flowthrough measurement value $U_s$, which began at point A or A', is terminated if before the attainment of the time period $t_r$ beginning at these points, a time $(t_r + t_p/2)$ has elapsed since the attainment of the upper reference value $U_{or}$ at point E by the actual flowthrough measurement value $U_s$; this time represents the sum of the time period $t_r$ for the reversed flow and half the oscillation duration $t_p/2$.

The various switching processes are performed in a known manner in the electronic control unit; see, for example, the circuitry shown in element 10, FIGS. 1, 2, 4 of U.S. Pat. No. 4,040,394, for controlling a fuel injection system 18.

The polarity reversal of the actual flowthrough measurement value $U_s$ when there is a flow reversal prevents an error in measurement by the flowthrough measuring device.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for measuring the pulsating air mass aspirated by an internal combustion system in a flow cross section by means of a flowthrough measuring device, which furnishes a flowthrough measurement value ($U_s$) associated with a flowthrough value (Q) of the air mass and for the correction of the flowthrough measurement value ($U_s$) in the event of reversed flow, comprising the steps of, ascertaining an upper reference value ($U_{or}$) in accordance with the rpm (n) of the engine, above which a reversed flow of the air takes place, comparing the actual flowthrough measurement value ($U_s$) furnished by the flowthrough measuring device with the upper reference value ($U_{or}$), detecting a time period ($t_r$) to begin upon attainment of the upper reference value ($U_{or}$) by the actual flowthrough measurement value ($U_s$), which time period ends whenever the actual flowthrough measurement value ($U_s$) has again dropped to the upper reference value ($U_{or}$), and storing the time period ($t_r$) for subsequent correction of the flowthrough measurement value ($U_s$) in the event of a reversed flow.

2. A method as defined by claim 1, wherein the polarity of the actual flowthrough measurement value ($U_s$) is reversed for the time period ($t_r$) whenever the actual flowthrough measurement value ($U_s$) attains a predetermined lower reference value ($U_{ur}$, $U_{smin}$).

3. A method as defined by claim 2, wherein the polarity reversal of the actual flowthrough measurement value ($U_s$) is terminated whenever the actual flowthrough measurement value ($U_s$) once again attains the predetermined lower reference value ($U_{ur}$, $U_{smin}$).

4. A method as defined in claim 2 or 3, wherein the actual minimum flowthrough measurement value ($U_{smin}$) serves as the lower reference value ($U_{ur}$).

5. A method as defined by claim 2, further comprising the step of, detecting the oscillation period ($t_p$) of the pulsating air from the rpm (n) of the engine, and wherein the polarity reversal of the actual flowthrough measurement value ($U_s$) is terminated whenever half the oscillation duration ($t_p/2$) has elapsed after the actual flowthrough measurement value ($U_s$) has dropped to the upper reference value ($U_{or}$).

6. A method as defined by claim 2, further comprising the step of, detecting the oscillation duration ($t_p$) of the pulsating air from the rpm (n) of the engine, and wherein the polarity reversal of the actual flowthrough measurement value ($U_s$) is terminated whenever a time $((t_r + t_p)/2)$ has elapsed after the attainment of the maximum actual flowthrough measurement value ($U_{smax}$), which time represents half the sum of the time period ($t_r$) for the reversed flow and the oscillation duration ($t_p$).

7. A method as defined by claim 2, further comprising the step of, detecting the oscillation duration ($t_p$) of the pulsating air from the rpm (n) of the engine, and wherein the polarity reversal of the actual flowthrough measurement value ($U_s$) is terminated whenever a time ($t_r + t_p/2$) has elapsed after the attainment of the upper reference value ($U_{or}$) by the actual flowthrough measurement value ($U_s$), which time represents the sum of the time period ($t_r$) for the reversed flow plus half the oscillation duration ($t_p/2$).

8. A method as defined by claim 1, further comprising the step of, detecting the maximum mean flowthrough value ($Q_{mv}$) at full load as a function of the rpm (n) of the engine and doubling the value thereof, and wherein the upper reference value ($U_{or}$) is ascertained to correspond to twice the maximum mean flowthrough measurement value ($2Q_{mv}$).

* * * * *